Figure 1:
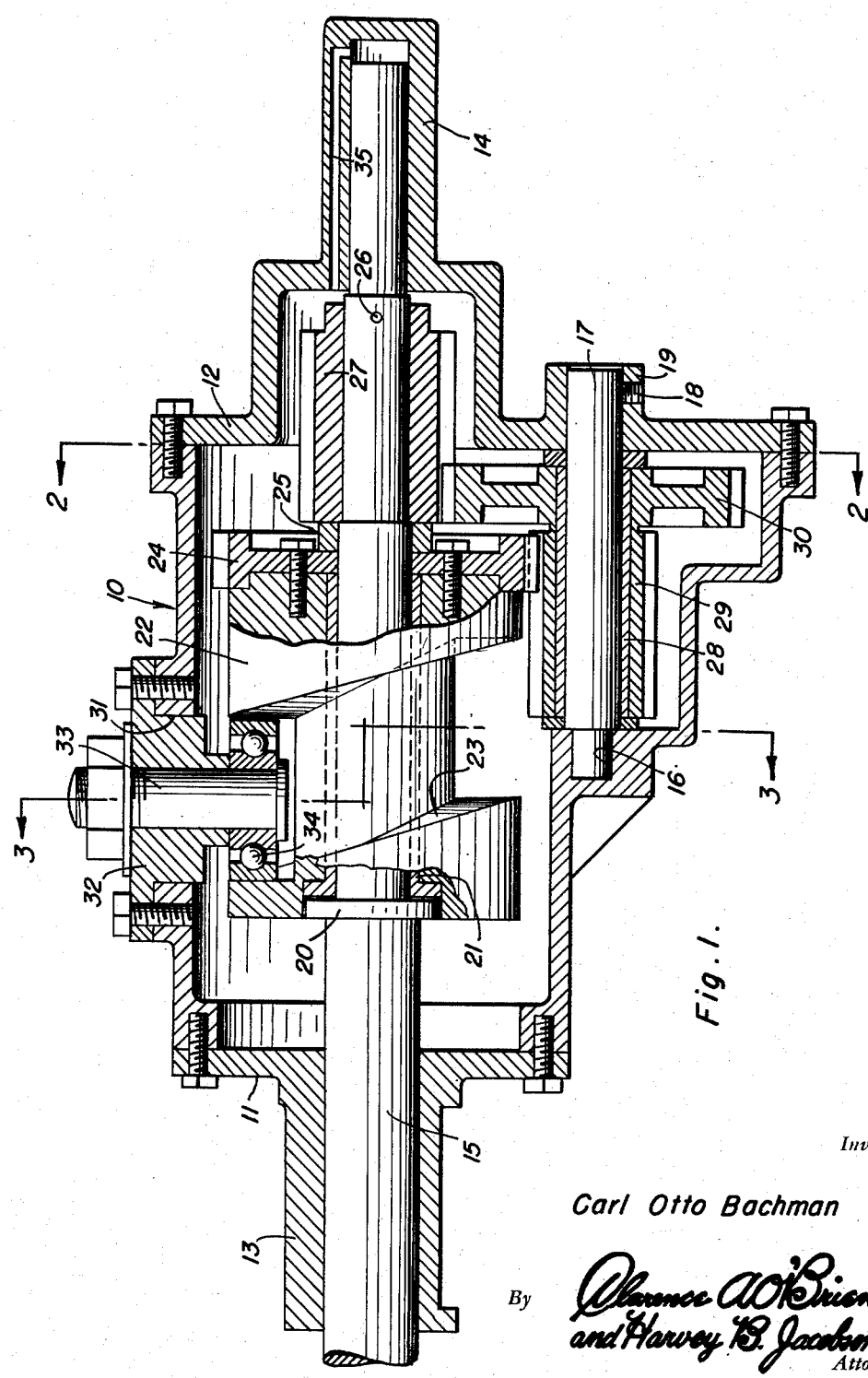

Inventor
Carl Otto Bachman

Dec. 25, 1951  C. O. BACHMAN  2,579,642
MECHANICAL MOVEMENT
Filed Oct. 12, 1948  2 SHEETS—SHEET 2
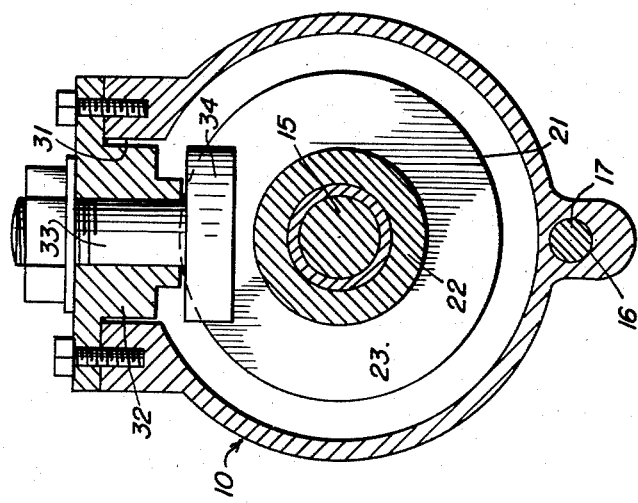
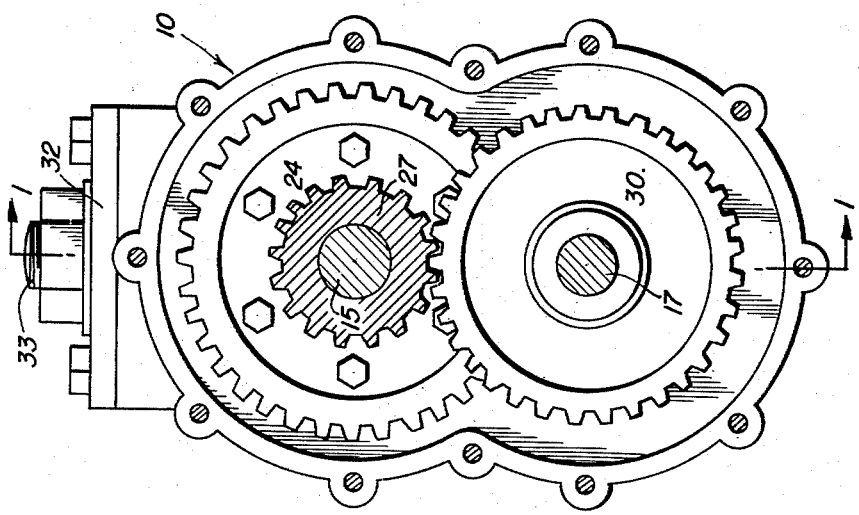
Inventor
Carl Otto Bachman
By *Clarence A. O'Brien
and Harvey B. Jacobson*
Attorneys Patented Dec. 25, 1951

2,579,642

UNITED STATES PATENT OFFICE 2,579,642

MECHANICAL MOVEMENT

Carl Otto Bachman, Watertown, N. Y.

Application October 12, 1948, Serial No. 53,998

1 Claim. (Cl. 74—22)

This invention relates to a mechanical movement and has for its primary object to impart reciprocal motion to a rotating shaft.

Another object of the invention is to reciprocate the shaft in timed relation to its speed of rotation.

The above and other objects may be attained by employing this invention which embodies among its features a shaft mounted to rotate about its longitudinal axis and to move in a rectilinear path along the longitudinal axis while so rotating, a sleeve member mounted on the shaft to move longitudinally in unison with the shaft, said sleeve member having a circumferential cam track, stationary means to engage said cam track to cause the sleeve member to reciprocate as it rotates, and means establishing rotary driving connection between the shaft and the sleeve member.

Other features include the employment of a speed reduction gear train to establish rotary driving connection between the shaft and the sleeve member.

Still other features include a cam groove intermediate the ends of the sleeve member, a stationary rider entering the groove and having a groove wall contacting member connected thereto through the medium of an anti-friction bearing in order to reduce friction loss in the operation of the device to a minimum.

In the drawings,

Figure 1 is a longitudinal sectional view through a housing illustrating my improved shaft reciprocating device mounted on the shaft to be reciprocated, Figure 2 is a vertical sectional view taken substantially along the line 2—2 of Figure 1, and Figure 3 is a vertical sectional view taken substantially along the line 3—3 of Figure 1.

Referring to the drawings in detail, a casing designated generally 10 is provided at opposite ends with end plates 11 and 12 carrying, respectively, bearing sleeves 13 and 14 in which a shaft 15 is mounted to rotate about its longitudinal axis, and to reciprocate longitudinally. The casing 10 is also provided intermediate its ends with a socket 16 for the reception of the inner end of a bearing stud 17, the outer end of which is retained by means of a set screw 18 in a socket 19 carried by the end wall 12. The sockets 16 and 19 are arranged in axial alignment so that the longitudinal axis of the bearing stud 17 lies parallel with the longitudinal axis of the shaft 15.

Carried by the shaft intermediate its ends, and near the end which extends through the bearing 13 is a thrust collar 20, and surrounding the shaft adjacent the thrust collar and extending toward the bearing 14 is a bearing bushing 21 on which a sleeve member 22 is mounted to rotate about the longitudinal axis of the shaft 15. This sleeve member is provided intermediate its ends with a peripheral cam groove 23, and attached to the end of the sleeve member opposite that engaging the thrust collar 20 is a driven gear 24. Surrounding the shaft 15 adjacent the driven gear 24 is a spacer collar 25 and pinned to the shaft, as at 26, is a broad faced drive pinion 27. It will thus be seen that while the sleeve member 22 is mounted to rotate about the shaft independently of the rotation of the shaft, both the shaft and the sleeve member will move longitudinally in unison.

Supported on the stud 17 between the sockets 16 and 19 is a bearing bushing or tubular countershaft 28 upon which is rotatably mounted a broad faced driven pinion 29 which has meshing engagement with the driven gear 24 and carries at one end a drive gear 30 which has meshing engagement with the broad faced drive pinion 27. It will thus be seen that as the shaft 15 is rotated, the pinion 27 will drive the drive gear 30, which in turn will rotate the driven pinion 29 and thus impart rotary motion to the driven gear 24 which in turn drives the sleeve member 22.

Formed in the side of the casing 10 diametrically opposite the stud 17 is an opening 31 for the reception of a plug 32 carrying an inwardly extending radial stud 33, upon the inner end of which is supported an anti-friction bearing 34, the outer race of which rides in the groove 23 so that as the sleeve member 22 is rotated through the medium of the gear train just described, the sleeve member will also be caused to move longitudinally and impart longitudinal reciprocal motion to the shaft 15. Inasmuch as the bearing 14 in which the shaft 15 is mounted has a closed end, I find it advantageous to form in said bearing a suitable duct 35 which communicates at one end with the interior of the casing 10 and at its opposite end with the extreme outer end of the opening in which the end of the shaft is received. It will thus be seen that despite the reciprocal movement of the shaft in the bearing 14, no back pressure will be created to hinder its movement in either direction.

In operation, it will be understood that as the shaft 15 is rotated, the drive pinion 27 will cause the drive gear 30 to rotate the driven pinion 29, which in turn imparts rotary motion to the driven gear 24 so as to cause the sleeve member 22 to rotate in unison therewith. By reason of the shape of the cam groove 23, it will be evident that as the sleeve member 22 rotates, the walls of the groove will engage the outer race of the anti-friction bearing 34 and inasmuch as the stud 33 is held stationary, it will be evident that the sleeve member 22 will be moved longitudinally back and forth as it rotates. This longitudinal reciprocal motion will be imparted to the shaft 15 by means of the thrust collar 20, the bearing bushing 21, the spacer sleeve 25, and the drive pinion 27 so that the shaft 15 will move longitudinally in unison with the sleeve member. By reason of the broad faced pinions 27 and 29, it will be obvious that the gears 24 and 30 will remain in meshing engagement therewith throughout the entire longitudinal movement of the shaft 15, and due to the speed reduction characteristics of the gear train as described, it will be evident that the sleeve member 22 will rotate at a considerably lower rate of speed than the speed of rotation of the shaft 15. It is also evident that by changing the sizes of the pinions 27 and 29, and of the gears 24 and 30, the ratio of speed between the shaft 15 and the sleeve member 22 may be varied.

From the foregoing, it will be obvious that a simple and efficient mechanism is provided for imparting longitudinal reciprocal motion to a rotating shaft.

While in the foregoing there has been shown and described the preferred embodiment of this invention, it is to be understood that minor changes in the details of construction and combination and arrangement of parts may be resorted to without departing from the spirit and scope of the invention as claimed.

Having thus described my invention, what I claim is:

A mechanical movement comprising a casing having removable end plates, a bearing sleeve integrally formed with and projecting outwardly from each end plate, said bearing sleeves being coaxial and one of said bearing sleeves being closed, a main shaft having an end portion slidably and rotatably supported in said bearing sleeves, a thrust collar fixed to said end portion of said main shaft and located within said casing, a sleeve member journaled for rotation on said end portion of said shaft and disposed entirely within said casing in spaced relation to said end plates, said sleeve member having first and second ends and a peripheral cam groove, the first end of said sleeve member abutting said thrust collar, said casing having an opening therein in registry with said sleeve member, a plug removably secured to said casing and received in said opening, a stud carried by said plug, an anti-friction bearing supported on the stud, said anti-friction bearing being received in said cam groove, a counter-shaft rotatably supported in the casing and paralleling the main shaft, a drive gear secured on said countershaft, a driven pinion also secured on said counter-shaft, a drive pinion fixed on the said end portion of said main shaft and meshing with said drive gear, and a driven gear secured to the second end of said sleeve member and meshing with said driven pinion, whereby rotation of said main shaft will cause rotation of said driven shaft and said sleeve member to impart axial sliding movement to said main shaft.

CARL OTTO BACHMAN.

REFERENCES CITED

The following references are of record in the file of this patent:

UNITED STATES PATENTS

| Number | Name | Date |
|---|---|---|
| 127,561 | Burns | June 4, 1872 |
| 1,418,126 | Cartlidge | May 30, 1922 |
| 1,736,822 | Dreisbach | Nov. 26, 1929 |
| 2,386,367 | Taylor | Oct. 9, 1945 |
| 2,457,565 | Kott | Dec. 28, 1948 |

FOREIGN PATENTS

| Number | Country | Date |
|---|---|---|
| 201,742 | Great Britain | Aug. 9, 1923 |